United States Patent
Dobkin et al.

(10) Patent No.: US 12,298,044 B2
(45) Date of Patent: May 13, 2025

(54) MULTICASCADE HEATING SYSTEM

(71) Applicant: N. A. M. TECHNOLOGY LTD., Maalot (IL)

(72) Inventors: Andrey Dobkin, Maalot (IL); Mikhael Sitkovsky, Carmiel (IL)

(73) Assignee: N. A. M. TECHNOLOGY LTD., Maalot (IL)

( * ) Notice: Subject to any disclaimer, the term of this patent is extended or adjusted under 35 U.S.C. 154(b) by 149 days.

(21) Appl. No.: 18/252,132

(22) PCT Filed: Nov. 1, 2021

(86) PCT No.: PCT/IL2021/051292
§ 371 (c)(1),
(2) Date: May 8, 2023

(87) PCT Pub. No.: WO2022/097134
PCT Pub. Date: May 12, 2022

(65) Prior Publication Data
US 2023/0400227 A1    Dec. 14, 2023

(30) Foreign Application Priority Data

Nov. 8, 2020 (IL) .......................... 278561

(51) Int. Cl.
*F25B 1/10* (2006.01)
*F25B 29/00* (2006.01)

(52) U.S. Cl.
CPC .............. *F25B 1/10* (2013.01); *F25B 29/003* (2013.01)

(58) Field of Classification Search
CPC .. F25B 1/10; F25B 7/00; F25B 29/003; F25B 2400/061; F25B 2700/21161
See application file for complete search history.

(56) References Cited

U.S. PATENT DOCUMENTS

| 2009/0211282 A1 | 8/2009 | Nishimura et al. |
| 2013/0104575 A1 | 5/2013 | Kontomaris |

(Continued)

FOREIGN PATENT DOCUMENTS

| CN | 203704103 U | 7/2014 |
| CN | 116294264 A * | 6/2023 |
| JP | H1137665 A * | 2/1999 |

OTHER PUBLICATIONS

English translation of Zhang et al. (CN 116294264 A). (Year: 2023).*

(Continued)

*Primary Examiner* — Miguel A Diaz
(74) *Attorney, Agent, or Firm* — William H. Dippert; Laurence A. Greenberg; Werner H. Stemer

(57) ABSTRACT

A multi cascade heating system that comprises a plurality of heat-pump circuits successionally connected. The heat pump circuits are connected to one another by a common heat exchanger. Each of the heat pump circuits comprises a condenser and a refrigerant circulating in the heat pump circuit for heating a fluid flowing through the condenser. The fluid is successionally passing through the condenser of each heat pump circuit so that the temperature of the fluid is higher in each succeeding condenser as it passes towards an outlet of the multi cascade heating system while heat not utilized by the condenser for heating the fluid is exploited for heating the refrigerant of a succeeding heat pump circuit by the heat exchanger.

14 Claims, 5 Drawing Sheets

(56) References Cited

U.S. PATENT DOCUMENTS

2014/0013790 A1* 1/2014 Asari .................. F25B 1/00
              62/335
2016/0356530 A1 12/2016 Cline et al.

OTHER PUBLICATIONS

English translation of Takada et al. (JP H1137665 A). (Year: 1999).*

* cited by examiner

MULTICASCADE HEATING SYSTEM

This patent application is a U.S. National Phase filing under 35 U.S.C. § 371 of PCT Patent Application No. PCT/IL2021/051292, filed Nov. 1, 2021, which is based upon and claims priority from Israeli Patent Application No. 278561, filed Nov. 8, 2020, each of which is expressly incorporated herein by reference in its entirety.

TECHNICAL FIELD

The present disclosed subject matter relates to heating systems in general. More particularly, the present disclosed subject matter relates to energy efficiency improvement of heating systems.

BACKGROUND

Commercially available heating, refrigeration, and air conditioning systems often utilize a multi-stage thermodynamic cycle also known as a cascade cycle. These systems are typically aimed at producing sanitary hot water up to 80° C.; heating using fluids, such as water, oil, or gas; and indoor environmental comfort.

A cascade refrigeration/heating cycle typically has two or more stage processes for systems that are employed to produce high-temperature heating or ultra-refrigeration.

The evaporation-condensation temperatures of each cycle are sequentially lower or higher with some overlap to cover the desired delta temperature, where the refrigerants are selected to work effectively in the temperature range they cover.

Commercially available cascade systems are usually provided with separate cascade cycles, each being sealed in separated loops, where the gases are compressed as a mixture but separated as one refrigerant condenses into a liquid.

However, the commercially available cascade systems introduce several constraints on the structure and operating conditions of such systems resulting in overall efficiency reduction.

BRIEF SUMMARY

The objective of the present disclosure is to overcome waste of energy and providing a multi cascade heating system having high coefficient of performance (COP).

According to a first aspect of the present disclosed subject matter a multi cascade heating system is provided that comprises: a plurality of heat-pump circuits connected successionally, wherein the heat-pump circuits are connected to one another by a heat-exchanger; wherein each heat-pump circuit comprising: a condenser; and a refrigerant circulating in the heat-pump circuit for heating a fluid flowing through the condenser; and wherein heat not utilized by the condenser for heating the fluid is exploited for heating the refrigerant of a succeeding heat-pump circuit by the heat exchanger.

In some exemplary embodiments, each heat-pump circuit further comprises: a compressor; an expansion valve; and conductors adapted to connect the condenser; the compressor; the expansion valve; and one side of the heat-exchanger in series, thereby enabling circulating the refrigerant in the heat-pump circuit In some exemplary embodiments, a first heat-pump circuit of the plurality of the heat-pump circuits further comprises an evaporator adapted to collect outdoor thermal energy.

In some exemplary embodiments, a power rating of a compressor of the heat-pump circuit is smaller than the power rating of a compressor of a preceded heat-pump circuit.

In some exemplary embodiments, a heat-output rating of a condenser of the heat-pump circuit is smaller than the heat-output rating of a condenser of a preceded heat-pump circuit.

In some exemplary embodiments, the refrigerants are is selected from a group consisting of R600, R410A, R507, R134A, R290, R32, R744, and wherein the heat-pump circuits can utilize a similar or different refrigerant.

In some exemplary embodiments, the condenser of the heat-pump circuit comprises an inlet and an outlet adapted to enable the fluid flowing through the condenser, and wherein the outlet can be connected to the inlet of a succeeding heat-pump circuit.

In some exemplary embodiments, the fluid is selected from a group consisting of sanitary water; industrial process liquid; water mixed with antifreeze liquid; oil; and any combination thereof.

In some exemplary embodiments, the heat-pump circuits are configured for heating at least two different fluids simultaneously.

According to another aspect of the present disclosed subject matter a fluid heating system is provided that comprises: a plurality of the multi-cascade heating systems of any one of the claims are utilized to overcome substantially high $\Delta T$ between desired fluid temperature and an outdoor temperature.

According to yet another aspect of the present disclosed subject matter an air handling unit comprising: the multi-cascade heating system of claim and a dedicated blower for each condenser; and wherein the condensers and their blowers are assembled in a row within an enclosure having air intake and an exhaust.

In some exemplary embodiments, the condensers are adapted for heating air flowing through them.

In some exemplary embodiments, a condenser having highest heat-output rating is assembled next to the intake and a condenser having lowest-output rating is assembled next to the exhaust.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
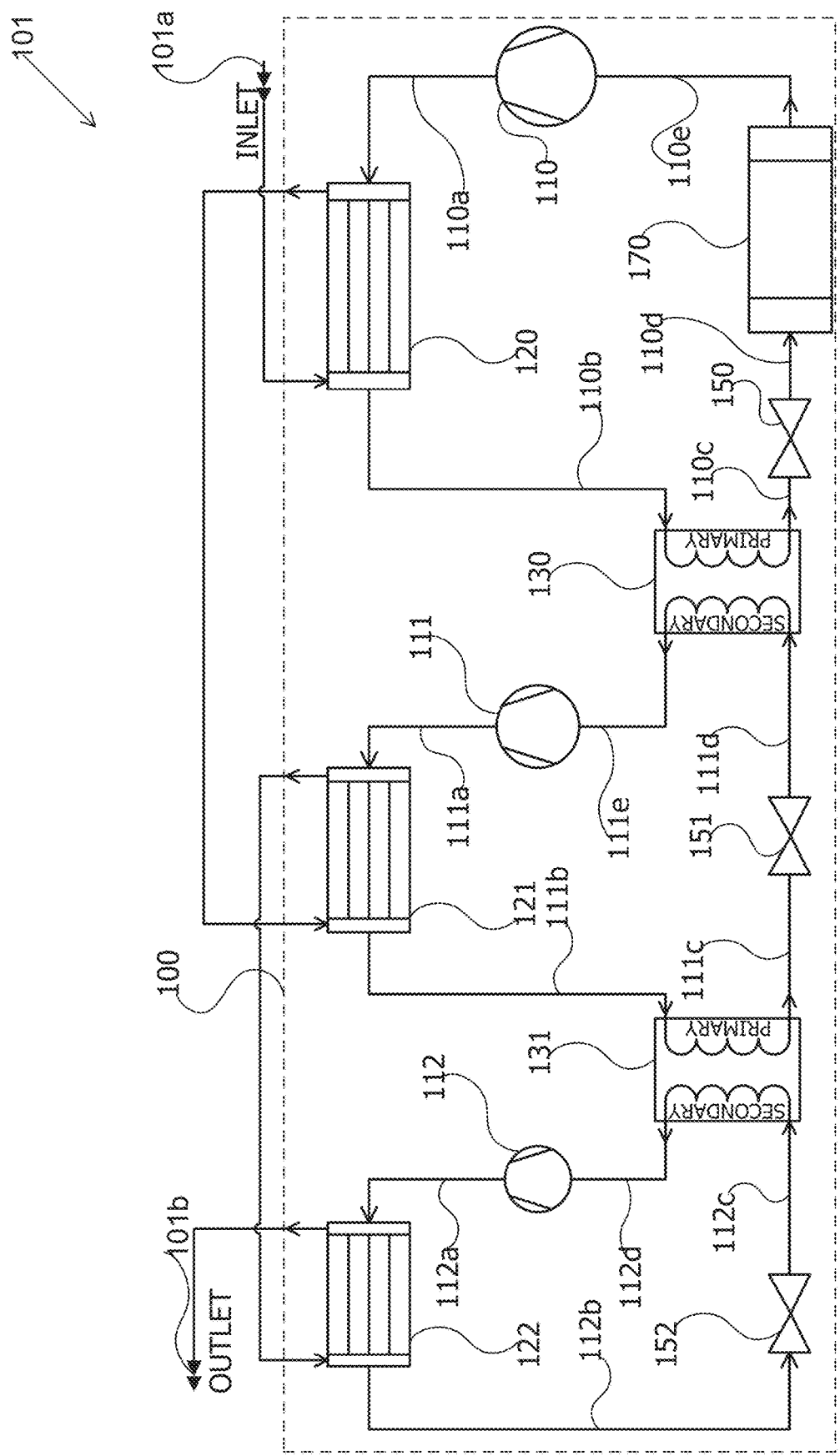
FIG. 1 shows a block diagram of a multi cascade heating system configured for heating a fluid, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

One technical objective of the present disclosure is providing a cascade system improves the energy efficiency of cascade heating systems by exploiting residual heat not utilized by the condensers of commercially available cascade systems. In some exemplary embodiments, residual heat generated by a plurality of condensers used for heating fluids is transferred to be exploited by a following cascade or heat-pump circuit and thereby increasing the system efficiency.

Another technical objective of the present disclosure is improving energy efficiency by reducing the size and power of compressors of secondary cascades, i.e. compressors of cascades that follow the first cascade. In some exemplary embodiments of the multi-cascade heating system of the present disclosure is comprised of three heat-pump circuits, wherein the power rating of the second circuit compressor is a quarter of the first circuit compressor and the power rating of the third circuit compressor is a quarter of the second circuit compressor.

Yet another technical objective of the present disclosure is improving the coefficient of performance (COP) of the multi cascade heating system of the present disclosure by at least 25% with respect to commercially available cascade heating system. A COP calculation of a simulation of the present disclosure system is provided in detail further below.

Referring now to FIG. 1, showing a block diagram of a multi cascade heating system configured for heating a fluid, in accordance with some exemplary embodiments of the disclosed subject matter. Configuration 101 is a system having exemplary architecture used for heating fluids. The configuration 101 is based on a multi-cascade heating system 100. In some exemplary embodiments, the multi-cascade heating system 100 comprises three cascading heat-pump circuits: a first-circuit, a second-circuit, and a third-circuit. It should be noted that the multi-cascade heating system of the present disclosure can be comprised of a plurality of heat-pump circuits. The multi-cascade heating system 100 of FIG. 1, is merely one exemplary embodiment used for describing the present disclosure.

In some exemplary embodiments, the first-circuit is comprised of the following components: a compressor 110, a condenser 120, a primary side of heat-exchanger 130, an expansion valve 150, and an evaporator 170. The components of the first circuit are connected to one another by means of refrigerant conductors 110a, 110b, 110c, 110d, and 110e for forming the heat-pump first-circuit.

In some exemplary embodiments, the second-circuit comprises of the following components: a compressor 111, a condenser 121, a primary side of heat-exchanger 131, an expansion valve 151, a secondary side of heat-exchanger 130. The components of the second-circuit are connected to one another by means of refrigerant conductors 111a, 111b, 111c, 111d, and 111e for forming the heat-pump first-circuit.

In some exemplary embodiments, the third-circuit is comprised of the following components: a compressor 112, a condenser 122, a secondary side of heat-exchanger 131, and an expansion valve 152. The components of the first circuit are connected to one another by means of refrigerant conductors 112a, 112b, 112c, and 112d for forming the heat-pump first-circuit.

In some exemplary embodiments, a refrigerant, such as R600, R410A, R507, R134A, R290, R32, R744, or the like, flows through the conductors and the components of the cascading heat-pump circuits. Yet, it will be noted that the refrigerants flowing in each circuit can be different, i.e. the first-circuit, the second-circuit, and the third-circuit can each have a different refrigerant type.

In some exemplary embodiments, the multi-cascade heating system 100 can be used for heating fluids, such as depicted in configuration 101. The fluids can be, for example, sanitary water, or milk for an industrial process, swimming pool water, or the like, i.e. direct-heating. Additionally, or alternatively, the fluids can be water mixed with antifreeze liquid, water, oil, or the like for medium-heating purposes, or the like.

Applications for direct-heating, e.g. sanitary water, are typically comprising a reservoir tank (not shown) to form a closed-loop. Meaning, liquid flows from the tank to an inlet of the system 100 and returns to the tank from an outlet of the system 100. Yet, it will be noted that the multi-cascade heating system 100 can be used for heating liquids for use in open-loop.

In medium-heating applications, the multi-cascade heating system 100 is connected in a closed-loop with a series of heaters, such as radiators, floor heating, boilers, independent air handling units (AHU), and any combination thereof, or the like. In such heating applications, the inlet and outlet of system 100 are connected in line with the heaters, so as to allow the same fluid to constantly circulate through system 100 and the heaters. Thereby, the fluid is heated by system 100 and the heat is dissipated to the ambient by the heaters.

In some exemplary embodiments of sanitary water applications, the water temperature at inlet 101a can vary, for example, between 55° C. to 59° C., whereas the temperature at the outlet 101b of system 100, can reach 60° C. to 70° C.

In the configuration 101 exemplary embodiment used for industrial process applications, the fluid temperature at inlet 101a can vary, for example, between 45° C. to 70° C., whereas the temperature at the outlet 101b of system 100, is designed to reach 55° C. to 90° C.

In the configuration 101 exemplary embodiment used for medium-heating applications, the fluid temperature at inlet 101a can vary, for example, between 45° C. to 55° C., whereas the temperature at the outlet 101b of system 100, is designed to reach 50° C. to 70° C.

The following is an example, attributed to configuration 101, (example 101) of the multi-cascade heating system 100 operation cycle used for heating sanitary water in accordance with the configuration 101 embodiment depicted in FIG. 1. For example—101, the water temperature entering the system 100 at inlet 101a is about 55° C., wherein the outdoor temperature is about −7° C. The sanitary water will be heated by condenser 120 to approximately 62° C., then proceeds to condenser 121 where they will be heated to approximately 67° C., and then to condenser 122 where they will be heated to about 70° C. from where the heated water will return via outlet 101b to the tank. This process is constantly repeated for maintaining the sanitary water desired temperature of 70° C. To do so, evaporator 170, which is exposed to the outdoor temperature, raises the temperature of the refrigerant of the first-circle (first-refrigerant) to −10° C. in a gas state. The refrigerant gas enters compressor 110 that raises the gas temperature to 95° C., which is afterwards condensed by condenser 120 to refrigerant liquid at 65° C., and thereby transfers heat to the sanitary water to raise its temperature from 55° C. to 62° C. It should be noted that the refrigerant liquid (at 65° C.) in conductor 110b is a residual heat, i.e. heat not utilized by the condensers, exploited for raising the temperature of the refrigerant of the second-circuit (second-refrigerant) by means of heat-exchanger 130. After transferring the residual heat by heat-exchanger 130; thereby heating the second-refrigerant, the temperature of the first-refrigerant at the entrance to the expansion valve 150 drops to 25° C., which changes the first-refrigerant to liquid/gas solution at −15° C. at the evaporator's 170 entrance, consequently raising the first-refrigerant (gas) to −10° C.

As a result of exploiting the residual heat, the temperature of the second-refrigerant exiting the expansion valve 151, as a liquid/gas solution, rises from 20° C. to 25° C. at a secondary side of the heat exchanger 130. Then, the refrigerant gas enters compressor 111 that raises the gas temperature to 100° C., which afterwards condensed by condenser 121 to refrigerant liquid at 70° C., and thereby transfers supplemental heat to the sanitary water that raises its temperature from 62° C. to 67° C. It will be noted that the heat of the refrigerant liquid (at 70° C.) in conductor 111b is a residual heat i.e. heat not utilized by the condensers, is exploited for raising the temperature of the refrigerant of the third-circuit (third-refrigerant) by means of heat-exchanger 131. After transferring the residual heat by heat-exchanger 131, and thereby heating the third-refrigerant, the temperature of the second-refrigerant at the entrance to the expansion valve 151 drops to 40° C., which evaporates the second-refrigerant at 20° C. at the secondary side of heat-exchanger 130, consequently raising the second-refrigerant (gas) to 25° C.

The operating cycle, as per example 101, is completed by the third-circuit as follows, the temperature of the third-refrigerant (in a gas state) at conductor 112c rises from 35° C. to 40° C. at a secondary side of the heat exchanger 131. Then, the refrigerant gas enters compressor 111 that raises the gas temperature to about 100° C., which is afterwards condensed by condenser 122 to refrigerant liquid at 73° C., and thereby transfers supplemental heat to the sanitary water that raise their temperature from 67° C. to 70° C. The refrigerant liquid that exits condenser 122 at 73° C. is then evaporated by expansion valve 152 to gas at 35° C. prior to reheating again by heat exchanger 131.

The following is a COP calculation attributed to the example 101 configuration described above that is based on a simulation of the system 100 operation cycle having the following parameters: A compressor 110 model number 6GE-34Y; a compressor 111 model number 2CES-4Y; and a compressor 112 model number 2KES-0.5Y. And a first circuit refrigerant R134a; a second circuit refrigerant R134a and a third circuit refrigerant R515b.

The calculated power consumption (P) of the compressors is P110=14.58 KW; P111=4.39 KW; and P112=1.06 KW. And the calculated heating turnout (Q) of the condensers is Q120=32.4 KW; Q121=16.06 KW and Q122=4.58 KW.

The COP of the system is given by $$COP = \frac{Q120 + Q121 + Q122}{P110 + P111 + P112} = \frac{32.4 + 16.06 + 5.48}{14.58 + 4.39 + 1.06} \cong 2.65,$$

whereas the COP of a commercially available cascade system that produces the same fluid heating turnout is about 2., i.e. 32% better than commercially available cascade systems.

Figure 2:
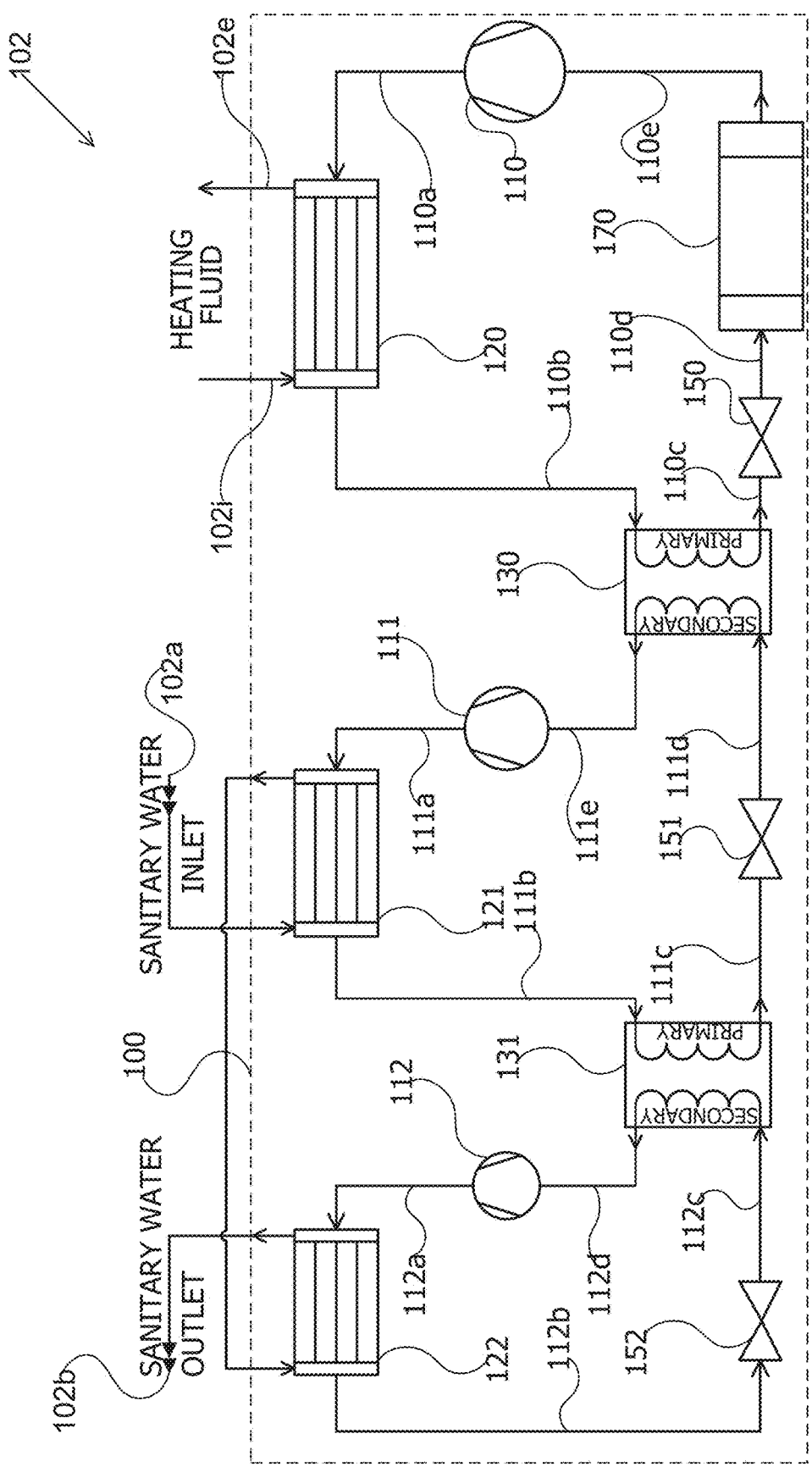
FIG. 2 shows a block diagram of the multi cascade heating system configured for heating a plurality of fluids, in accordance with some exemplary embodiments of the disclosed subject matter.

Referring now to FIG. 2, showing a block diagram of the multi cascade heating system configured for heating a plurality of fluids, in accordance with some exemplary embodiments of the disclosed subject matter. Configuration 102 is a system exemplary architecture used for heating a plurality of fluids. Configuration 102 is based on the multi-cascade heating system 100. In some exemplary embodiments, configuration 102 utilizes the multi-cascade heating system 100, such as depicted in the description of FIG. 1. Yet, it will be reminded that the multi-cascade heating system 100, of FIG. 2, is merely one exemplary embodiment used for describing the present disclosure.

In some exemplary embodiments, configuration 102 depicts the utilization of the multi-cascade heating system 100 for medium-heating applications and direct-heating applications simultaneously.

For the medium-heating, the multi-cascade heating system 100 is connected inline (series), forming a closed-loop with a plurality of heaters (not shown), such as radiators, floor heating, boilers, independent air handling units (AHU), and any combination thereof, or the like. In some exemplary embodiments, the heating fluid, such as oil, water mixed with antifreeze liquid, or the like, enters the system 100 via port 102i and exits from the system 100 back to the heaters via port 102e. In the configuration 102 exemplary embodiment, the fluid temperature at port 102i can vary, for example, between 45° C. to 55° C., whereas the temperature at port 101e can reach 50° C. to 70° C. In medium-heating application, the heating fluid constantly circulates through system 100 and the heaters. Thereby, the fluid is heated by system 100 and the heat is dissipated to the ambient by the heaters.

For direct-heating, e.g. sanitary water, the multi-cascade heating system 100 is connected inline (series) forming a closed-loop with a reservoir tank (not shown). In some exemplary embodiments, the sanitary water enters the system 100 inlet 102a and exits from the system 100 back to the tank via outlet 102b. In the configuration 102 exemplary embodiment, the sanitary water temperature at inlet 102a can vary, for example, between 55° C. to 59° C., whereas the temperature outlet 102b can reach 60° C. to 70° C.

In the sanitary water heating application, the water constantly circulates through system 100 and the tank. Thereby, maintaining a desired water temperature in the tank.

The following is an example, attributed to configuration 102, (example 102) of the multi-cascade heating system 100 operation cycle, used for simultaneously heating sanitary water and indoor heating in accordance with the configuration 102 embodiment depicted in FIG. 2. In example 102, the water temperature entering the system 100 at inlet 102a is about 55° C., the fluid temperature entering the system 100 at port 102i is about 40° C. wherein the outdoor temperature is about −7° C.

The heating fluid will be heated by condenser 120 to approximately 50° C., the sanitary water will be heated by condenser 121 to approximately 65° C., and then water proceeds to condenser 122 where they will be heated to about 70° C. from where the heated water will return via outlet 102b to the tank. This process is constantly repeated for maintaining the sanitary water desired temperature of 70° C. and a space temperature of 50° C.

To do so, evaporator 170, which is exposed to the outdoor temperature, drops the temperature of the first-refrigerant to −10° C. in a gas state. The refrigerant gas enters compressor 110 that raises the gas temperature to 90° C., which is afterwards condensed by condenser 120 to refrigerant liquid at 50° C., and thereby transfers heat to the heating fluid to raise its temperature from 40° C. to 50° C. It should be noted that the heat of the refrigerant liquid (at 50° C.) in conductor 110b is a residual heat exploited for raising the temperature of the refrigerant of the second-circuit (second-refrigerant) by means of heat-exchanger 130. After transferring the residual heat, by heat-exchanger 130 and thereby heating the second-refrigerant, the temperature of the first-refrigerant at the entrance to the expansion valve 150 drops to 20° C., which changes the first-refrigerant to liquid/gas solution at −15° C. at the evaporator's 170 entrance, consequently raising the first-refrigerant (gas) to −10° C.

As a result of exploiting the residual heat, the temperature of second-refrigerant exiting the expansion valve 151, in a gas state, rises from 15° C. to 20° C. at a secondary side of the heat exchanger 130. Then, the refrigerant (liquid/gas solution) enters compressor 111 that raises the second-refrigerant (gas) temperature to 95° C., which afterwards condensed by condenser 121 to refrigerant liquid at 70° C., and thereby transfers heat to the sanitary water that raises its temperature from 55° C. to 65° C. It will be noted that the refrigerant liquid (at 70° C.) in conductor 111b is a residual heat exploited for raising the temperature of the third-refrigerant by means of heat-exchanger 131. After transferring the residual heat by heat-exchanger 131 and thereby heating the third-refrigerant, the temperature of the second-refrigerant at the entrance to the expansion valve 151 drops to 40° C., which evaporates the second-refrigerant at 15° C. (liquid/gas solution) at the secondary side of heat-exchanger 130, consequently raising the second-refrigerant (gas) to 20° C.

The operating cycle, as per example 102, is completed with the third-circuit as follows, the temperature of the third-refrigerant (in a gas state) at conductor 112c rises from 35° C. to 40° C. at a secondary side of the heat exchanger 131. Then, the refrigerant gas enters compressor 111 that raises the gas temperature to about 100° C., which is afterwards condensed by condenser 122 to refrigerant liquid at 73° C., and thereby transfers supplemental heat to the sanitary water that raises their temperature from 65° C. to 70° C. The refrigerant liquid that exits condenser 122 at 73° C. is then evaporated by expansion valve 152 to liquid/gas solution at 35° C. prior to reheating again by heat exchanger 131.

Figure 3:
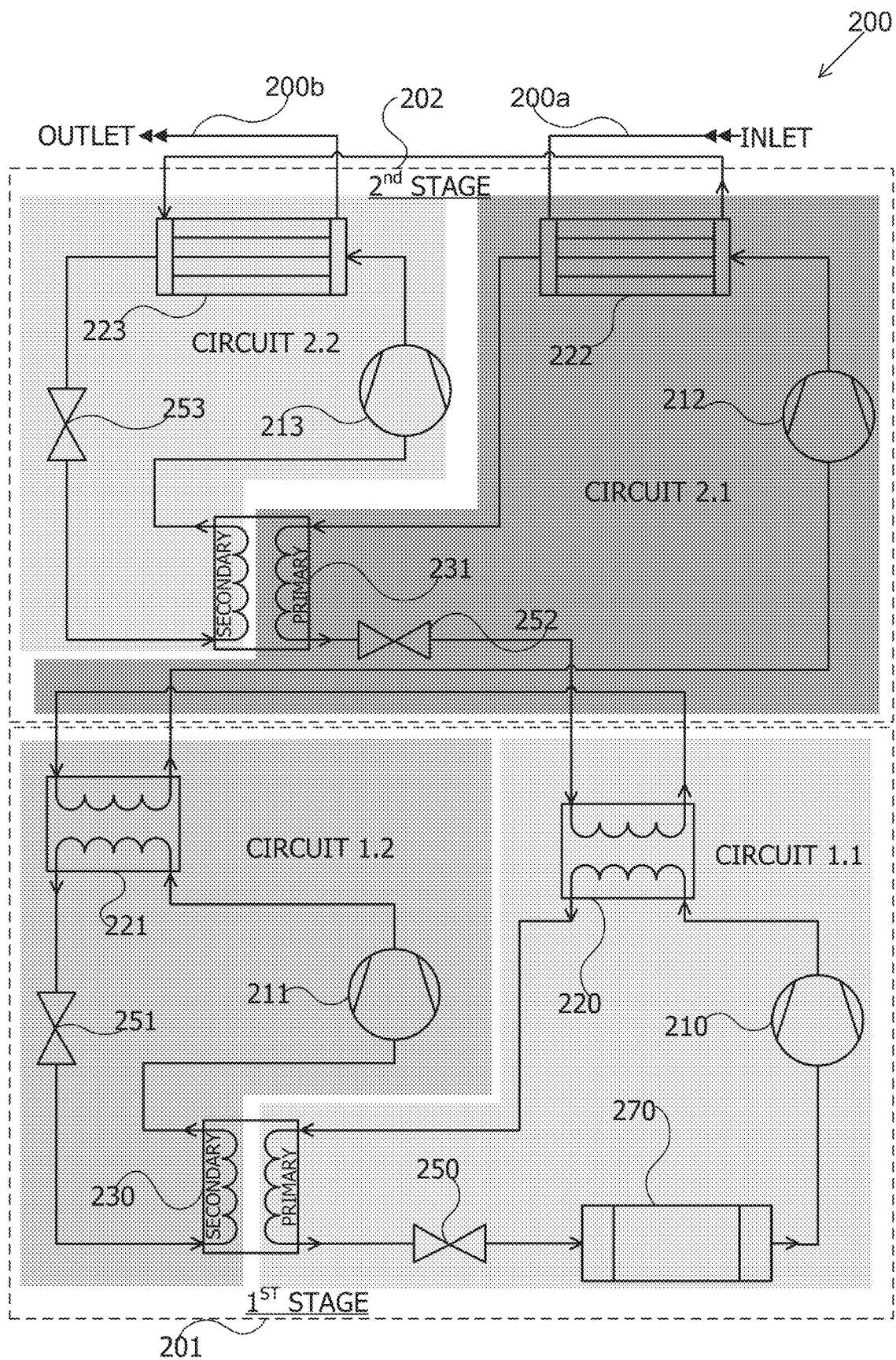
FIG. 3 shows a block diagram of another multi cascade heating system for heating a fluid, in accordance with some exemplary embodiments of the disclosed subject matter.

Referring now to FIG. 3 showing a block diagram of another multi-cascade heating system for heating a fluid, in accordance with some exemplary embodiments of the disclosed subject matter. Multi cascade heating system 200 can be utilized for fluid heating applications where the temperature difference (ΔT) between the desired fluid temperature and the (outdoor) temperature is relatively high, e.g. greater than 80° C.

In some exemplary embodiments, the multi-cascade heating system 200 is a fluid heating system comprised of two stages of multi-cascade heating system, a first cascade stage 201 and a second cascade stage 202. Each cascade stage comprises heat-pump circuits: a circuit 1.1 and a circuit 1.2 of cascade stage 201 and a circuit 2.1 and a circuit 2.2 of cascade stage 202. It should be noted that the multi-cascade heating system of the present disclosure comprises a plurality of cascade stages, each having a plurality of heat-pump circuits, and the multi-cascade heating system 200 is merely one exemplary embodiment used for describing the present disclosure.

It will be appreciated that the multi-cascade heating system 200 comprises (employs) a plurality of cascade stages for increasing the system's ΔT and thereby overcome compressors pressure-yield limitations, which limits the system's ΔT.

In some exemplary embodiments, circuit 1.1 comprises the following components: a compressor 210, a heat-exchanger 220, a primary side of heat-exchanger 230, an expansion valve 250, and an evaporator 270. The components of the circuit 1.1 are connected to one another by means of refrigerant conductors forming together the heat-pump circuit 1.1.

In some exemplary embodiments, circuit 1.2 comprises of the following components: a compressor 211, a heat-exchanger 221, an expansion valve 251, a secondary side of heat-exchanger 230. The components of circuit 1.2 are connected to one another by means of refrigerant conductors forming together the heat-pump circuit 1.2.

In some exemplary embodiments, circuit 2.1 is comprised of the following components: a compressor 212, a condenser 222, a primary side of heat-exchanger 231, and an expansion valve 252. The components of circuit 2.1 are connected to one another by means of refrigerant conductors forming together the heat-pump circuit 2.1.

In some exemplary embodiments, circuit 2.2 is comprised of the following components: a compressor 213, a condenser 223, an expansion valve 253, a secondary side of heat-exchanger 231. The components of circuit 2.2 are connected to one another by means of refrigerant conductors forming together the heat-pump circuit 2.2.

In some exemplary embodiments, a refrigerant, such as R600, R410A, R507, R134A, R290, R32, R744, or the like, flows through the conductors and the components of the cascading heat-pump circuits. In some exemplary embodiments, the refrigerants flowing in each circuit can be different, i.e. circuit 1.1, circuit 1.2, circuit 2.1, and circuit 2.2, can each have a different refrigerant, i.e. refrigerant-1.1, refrigerant-1.2, refrigerant-2.1, and refrigerant-2.2 respectively.

In some exemplary embodiments, the multi-cascade heating system 200 can be used for direct-heating, such as for example sanitary water, or milk for an industrial process. In some exemplary embodiments, the multi-cascade heating system 200 can be used for medium-heating that use fluids, such as water mixed with antifreeze liquid, water, oil, or the like. In some exemplary embodiments, fluids that are heated by the system may circulate in a closed-loop or flowing in an open-loop. Additionally, or alternatively, the multi-cascade heating system 200 can be utilized for fluid heating applications where the ΔT between the ambient and the desired fluid temperature is relatively high, e.g. >80° C. System 200 is employing two cascade stages 201 and 202 in applications where high ΔT is needed since the compressors have limited pressure span resulting in reduced ΔT. In some exemplary embodiments, the multi-cascade heating system 200 can be connected in a closed-loop with direct-heating elements or with medium-heating elements. For example, a series of heaters, radiators, floor heating, boilers, independent air handling units (AHU), sanitary water tank, swimming pools, and any combination thereof, or the like. In such heating applications, the inlet and outlet of system 200 are connected in line with the elements, so as to allow the fluid to constantly circulate through system 200 and heating loads.

It should be noted that regardless of the application, i.e. industrial, medium-heating, or direct-heating, the temperature at inlet 200a can vary, for example, between 40° C. to 60° C., whereas the temperature at the outlet 200b of system 200, is designed to reach 65° C. to 85° C.

The following is an example (example 200), attributed to the multi-cascade heating system 200 operation cycle used for heating sanitary water in accordance with the embodiment of FIG. 3. For example-200, the water temperature entering the system 200 at inlet 200a is about 60° C., wherein the outdoor temperature is about −30° C. The sanitary water will be heated by condenser 222 to approximately 83° C., then will proceed to condenser 223, where the water will be heated to approximately 90° C., from where the heated water will return via outlet 101b to the tank.

This process is constantly repeated for maintaining the sanitary water desired temperature of 90° C. To do so, evaporator 270, which is exposed to the outdoor temperature, drops the temperature of refrigerant-1.1 to −35° C. in a gas state. The refrigerant-1.1 enters compressor 210 that raises the gas temperature to 60° C., which is afterwards condensed by heat-exchanger (HE) 220 to refrigerant liquid at 25° C., and thereby transfers heat to refrigerant-2.1, of circuit-2.2 that is used for heating the sanitary water. It should be noted that the refrigerant-1.1 exits HE 220 as a liquid at 25° C. maintains residual heat that is exploited for raising the temperature of the refrigerant-1.2 by means of HE 230.

After transferring the residual heat by heat-exchanger 230 and thereby heating the refrigerant 1.2, the temperature of refrigerant 1.1 at the entrance to the expansion valve 250 drops to −10° C., which changes the refrigerant 1.1 from liquid to liquid/gas mixture at −40° C. at the evaporator's 270 entrance, consequently raising the mixture to −35° C.

In accordance with example 200, the temperature of refrigerant 1.2 exiting the expansion valve 251, rises from −15° C. to −10° C. at a secondary side of the heat exchanger 230. Then, the refrigerant 1.2 (liquid/gas solution state) enters compressor 111 that raises its temperature to 60° C. (gas), which is afterwards condensed by HE 221 to refrigerant liquid at 25° C., and thereby transfers supplemental heat to refrigerant 2.1 that is used for heating the sanitary water. After heating the refrigerant 2.1, the temperature of the refrigerant 1.2 at the entrance to the expansion valve 251 drops to 25° C., which changes the refrigerant 1.2 to liquid/gas mixture at −15° C. at the secondary side of heat-exchanger 230 that raises refrigerant-1.2 to −10° C.

It should be noted that cascade stage 201 evaporates refrigerant 2.1 that exits expansion valve 252 from liquid/gas mixture state at 20° C. into a gas at 25° C. by means of heat-exchangers 220 and 221.

The refrigerant 2.1 (gas) at 25° C. enters compressor 212 that raises the refrigerant-2.1 temperature to about 110° C., which is afterwards condensed by condenser 222 to refrigerant 2.1 liquid at 65° C., and thereby transfers heat to the sanitary water that raises their temperature from 60° C. to 83° C. It should be noted that the refrigerant 2.1 exits condenser 222 as a liquid at 65° C. having a residual heat that is exploited for raising the temperature of the refrigerant 2.2 by means of HE 231.

The operating cycle, as per example 200, is completed at circuit 2.2 as follows: refrigerant 2.2 enters a secondary side of the HE 231 as liquid/gas mixture at 35° C. and exits as a gas at 40° C. into compressor 213 that raises the gas temperature to about 110° C., which is afterwards condensed by condenser 223 to refrigerant liquid at 90° C., and thereby transfers supplemental heat to the sanitary water that raises their temperature from 83° C. to 90° C. The refrigerant 2.2 (liquid) that exits condenser 223 at 73° C. is then evaporated by expansion valve 253 to liquid/gas mixture at 35° C. prior to reheating again by heat exchanger 231.

Figure 4:
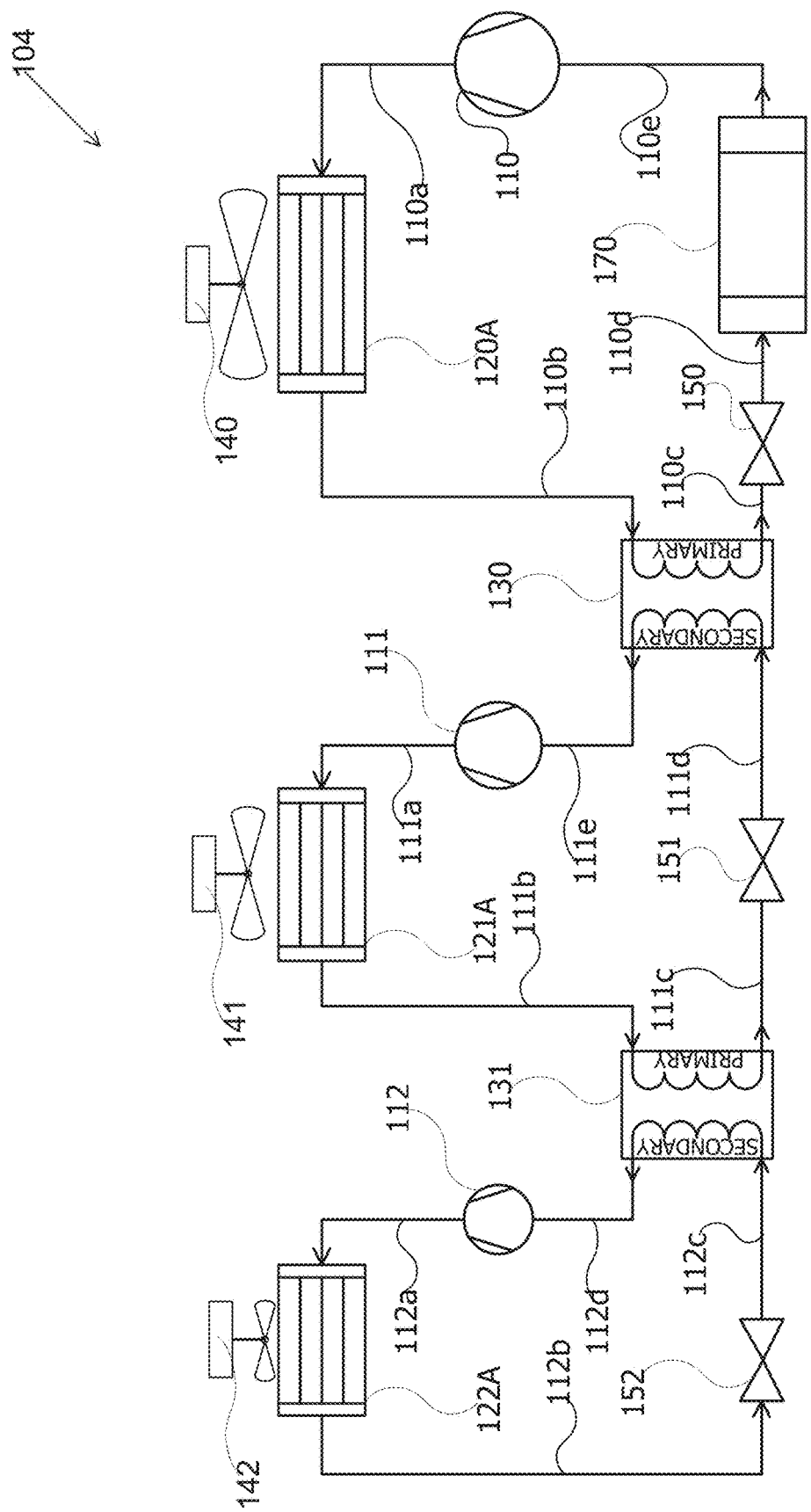
FIG. 4 shows a block diagram of yet another multi cascade heating system configured as air handling unit (AHU), in accordance with some exemplary embodiments of the disclosed subject matter.

Referring now to FIG. 4, showing a block diagram of yet another multi-cascade heating system configured as an air handling unit (AHU), in accordance with some exemplary embodiments of the disclosed subject matter. AHU 104 is a system exemplary architecture/configuration used for air handling units. The configuration of AHU 104 is based on system 100.

In some exemplary embodiments, the AHU 104 is an integration of the air handling unit and the multi-cascade heating system 100, depicted in the description of FIG. 1, adapted to be utilized as an autonomous air handling unit 104.

It should be noted that all the AHU 104 components are identical to the multi-cascade heating system 100, of FIG. 1, except condensers 120, 121, and 122 that are replaced by condensers 120A, 121A, and 122A that comprise blowers 140, 141, and 142 respectively.

AHU 104 utilizes the multi-cascade heating system 100 depicted in the description of FIG. 1. with the following changes. It will be appreciated that the AHU 104 of FIG. 4, is merely one exemplary embodiment used for describing the present disclosure that can comprise a plurality cascade stage.

Figure 5:
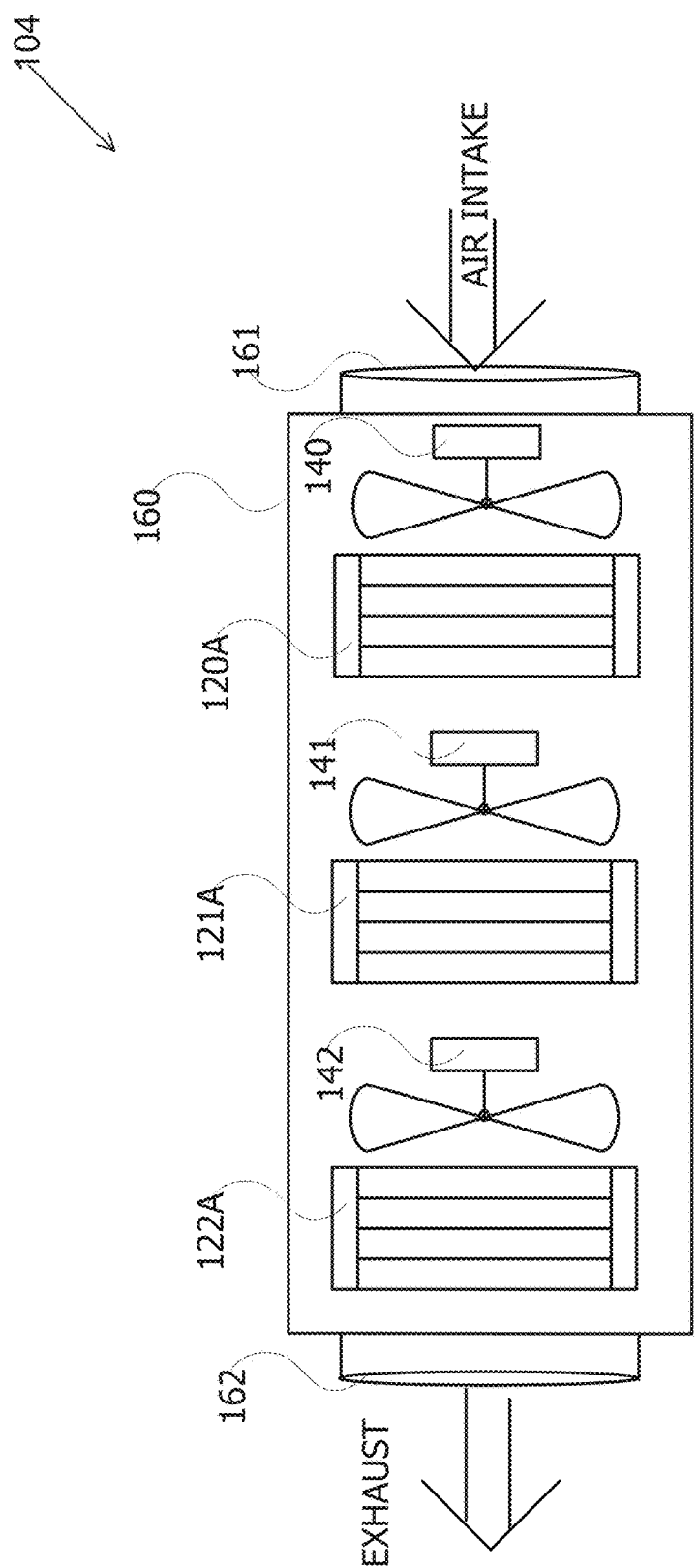
FIG. 5 illustrates a layout of the multi cascade-based AHU, in accordance with some exemplary embodiments of the disclosed subject matter.

Referring now to FIG. 5 illustrating a layout of the multi-cascade-based AHU, in accordance with some exemplary embodiments of the disclosed subject matter. the AHU 104, of FIG. 4 is incorporated heating structure 160.

In some exemplary embodiments, the heating structure 160 can be an enclosure that encapsulates a plurality of condensers, for example, condensers 120A, 121A, and 122A and their associated blowers 140, 141, and 142, respectively. In some exemplary embodiments, low-temperature air, ranging between 18° C. to 24° C. is sucked through intake 161 and gradually heated up by the plurality of condensers and then blown back into an indoor space via exhaust 162.

Referring back to FIG. 4. In some exemplary embodiments, low-temperature air entering the AHU 104, via intake 161 of FIG. 5, can vary between 18° C. to 24° C. By-passing through the AHU 104 the air is gradually heated until venting, via exhaust 162 of FIG. 5, at a temperature that reaches 40° C. to 45° C.

In such a medium-heating application, the heating fluid constantly circulates through system 100 and the heaters. Thereby, the fluid is heated by system 100 and the heat is dissipated to ambient by the heaters.

The following is an example, attributed to configuration 104, (example 104) of the multi-AHU 104 operation cycle, used for heating air in an air handling unit. In example 102, the air temperature entering the AHU 104 is about 20° C., and wherein the outdoor temperature is about −7° C.

The air will be first heated by condenser 120 to approximately 35° C., and then it will be heated by condenser 121 to approximately 42° C., and finally, condenser 122 will raise the air temperature to about 45° C. from where the heated air will be vented to an indoor space via exhaust 162. This process is constantly repeated for maintaining the indoor at the desired temperature of 45° C.

To do so, evaporator 170, which is exposed to the outdoor temperature, drops the temperature of the first-refrigerant to −10° C. in a gas state. The refrigerant gas enters compressor 110 that raises the gas temperature to 90° C., which is afterwards condensed by condenser 120 to refrigerant liquid at 45° C., and thereby transfers heat to the flowing air for raising its temperature from 20° C. to 35° C. It should be noted that the refrigerant liquid (at 45° C.) in conductor 110$b$ maintains residual heat that is exploited for raising the temperature of the second-refrigerant by means of heat-exchanger 130. After transferring the residual heat by heat-exchanger 130 and thereby heating the second-refrigerant, the temperature of the first-refrigerant at the entrance to the expansion valve 150 drops to 15° C., which changes the first-refrigerant to liquid/gas solution at −15° C. at the evaporator's 170 entrance, consequently raising the first-refrigerant (gas) to −10° C.

In accordance with example 104, the temperature of second-refrigerant exiting the expansion valve 151, in a gas state, rises from 10° C. to 15° C. at a secondary side of the heat exchanger 130. Then, the refrigerant gas enters compressor 111 that raises the gas temperature to 95° C., which afterwards is condensed by condenser 121 to refrigerant liquid at 50° C., and thereby transfers supplementary heat to the flowing liquid for raising its temperature from 35° C. to 42° C. It will be noted that the refrigerant liquid (at 50° C.) in conductor 111$b$ maintains a residual heat that is exploited for raising the temperature of the refrigerant by means of heat-exchanger 131. After transferring the residual heat by heat-exchanger 131 and thereby heating the third-refrigerant, the temperature of the second-refrigerant at the entrance to the expansion valve 151 drops to 30° C., which evaporates the second-refrigerant at 10° C. at the secondary side of heat-exchanger 130, consequently raising the second-refrigerant (gas) to 15° C.

The operating cycle, as per example 104, is completed with the third-circuit as follows, the temperature of the third-refrigerant (in a gas state) at conductor 112$c$ rises from 25° C. to 30° C. at a secondary side of the heat exchanger 131. Then, the refrigerant gas enters compressor 111 that raises the gas temperature to about 100° C., which is afterwards condensed by condenser 122 to refrigerant liquid at 73° C., and thereby transfers supplemental heat to the flowing air for raising its temperature from 42° C. to 45° C. The refrigerant liquid that exits condenser 122 at 73° C. is then evaporated by expansion valve 152 to gas at 25° C. prior to reheating again by heat exchanger 131.

In some exemplary embodiments, the COP of the multi-cascade heating system of the present disclosure can be further improved by installing the system, except the evaporator, indoors; enhancing heating insulation at the entrance to expansion valve 150/250; and any combination thereof, or the like.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present subject matter.

The invention claimed is:

1. A multi cascade heating system comprising:
   a plurality of heat-pump circuits successively connected, wherein the heat-pump circuits are connected to one another by a common heat-exchanger;
   wherein each heat-pump circuit further comprises:
      a condenser; and
      a refrigerant circulating in the heat-pump circuit for heating a fluid flowing through the condenser; and
   wherein the fluid is successively passing through the condenser of each heat-pump circuit so that the temperature of the fluid is higher in each succeeding condenser as it passes towards an outlet of the multi cascade heating system while heat not utilized by the condenser for heating the fluid is exploited for heating the refrigerant of a succeeding heat-pump circuit by the common heat exchanger.

2. The multi-cascade heating system of claim 1, wherein each heat-pump circuit further comprises: a compressor; an expansion-valve; and conductors adapted to connect the condenser; the compressor; the expansion-valve; and one side of the common heat-exchanger in series, thereby circulating the refrigerant in the heat-pump circuit.

3. The multi-cascade heating system of claim 1, wherein a first heat-pump circuit of the plurality of the heat-pump circuits further comprises an evaporator adapted to collect outdoor thermal energy.

4. The multi-cascade heating system of claim 1, wherein a power rating of a compressor of one of the plurality of heat-pump circuits is smaller than the power rating of a compressor of a preceded heat-pump circuit.

5. The multi-cascade heating system of claim 1, wherein a heat-output rating of a condenser of one of the plurality of heat-pump circuits is smaller than the heat-output rating of a condenser of a preceded heat-pump circuit.

6. The multi-cascade heating system of claim 1, wherein the refrigerant is selected from the group consisting of n-butane, difluoromethane, pentafluoroethane, 1,1,1,2-tetrafluoroethane, propane, and carbon dioxide, and wherein the heat-pump circuits can utilize a different refrigerant.

7. The multi-cascade heating system of claim 1, wherein the condensers of the heat-pump circuits comprise an inlet and an outlet adapted to enable said fluid flowing through the condensers, and wherein the outlet of each condenser can be respectively connected to the inlet of a succeeding heat-pump circuit.

8. The multi-cascade heating system of claim 1, wherein the fluid is selected from the group consisting of sanitary water; industrial process liquid; water mixed with antifreeze liquid; oil; and any combination thereof.

9. The multi-cascade heating system of claim 1, wherein the heat-pump circuits are configured for heating at least two different fluids simultaneously.

10. A fluid heating system comprising: a plurality of the multi-cascade heating systems of claim 1.

11. The fluid heating system of claim 10, wherein the plurality of the multi-cascade heating systems is utilized to overcome a ΔT between desired fluid temperature and an outdoor temperature.

12. An air handling unit comprising:
the multi-cascade heating system of claim 5; and
a dedicated blower for each condenser; and
wherein the condensers and each dedicated blower are assembled in a row within an enclosure having an air intake and an exhaust.

13. The air handling unit of claim 12, wherein the condensers are adapted for heating air flowing through them.

14. The air handling unit of claim 12, wherein a condenser having a highest heat-output rating is assembled next to the intake and a condenser having a lowest-output rating is assembled next to the exhaust.

* * * * *